United States Patent
Shimizu

(10) Patent No.: US 7,581,455 B2
(45) Date of Patent: Sep. 1, 2009

(54) MAGNETOSTRICTIVE TORQUE SENSOR AND ELECTRIC POWER STEERING APPARATUS

(75) Inventor: Yasuo Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/074,860

(22) Filed: Mar. 6, 2008

(65) Prior Publication Data
US 2008/0216589 A1    Sep. 11, 2008

(30) Foreign Application Priority Data
Mar. 7, 2007    (JP) .............. 2007-056596

(51) Int. Cl.
*G01L 3/00* (2006.01)
(52) U.S. Cl. ................................. 73/862.333
(58) Field of Classification Search ................................
73/862.331–862.338
See application file for complete search history.

(56) References Cited

U.S. PATENT DOCUMENTS 6,595,074 B2    7/2003    Shimizu et al.
6,959,781 B2 *    11/2005    Shimizu et al. ............. 180/444

FOREIGN PATENT DOCUMENTS

| JP | 09-159551 | 6/1997 |
|---|---|---|
| JP | 2002-257648 | 9/2002 |
| JP | 2004-245636 | 9/2004 |

* cited by examiner

*Primary Examiner*—Lisa M Caputo
*Assistant Examiner*—Octavia Davis
(74) *Attorney, Agent, or Firm*—Carrier, Blackman & Associates, P.C.; William D. Blackman; Joseph P. Carrier

(57) ABSTRACT

A magnetostrictive torque sensor includes a rotating shaft rotatably supported; magnetostrictive materials provided on a surface of the rotating shaft, magnetic permeability of which changes according to the magnitude of rotary torque acting on the rotating shaft; and at least two detection coils provided to the rotating shaft, which detect change in the magnetic permeability of the magnetostrictive materials to output in the form of electrical change. Section secondary moments of the rotating shaft at its parts on which the detection coils are respectively placed are different from each other.

4 Claims, 8 Drawing Sheets

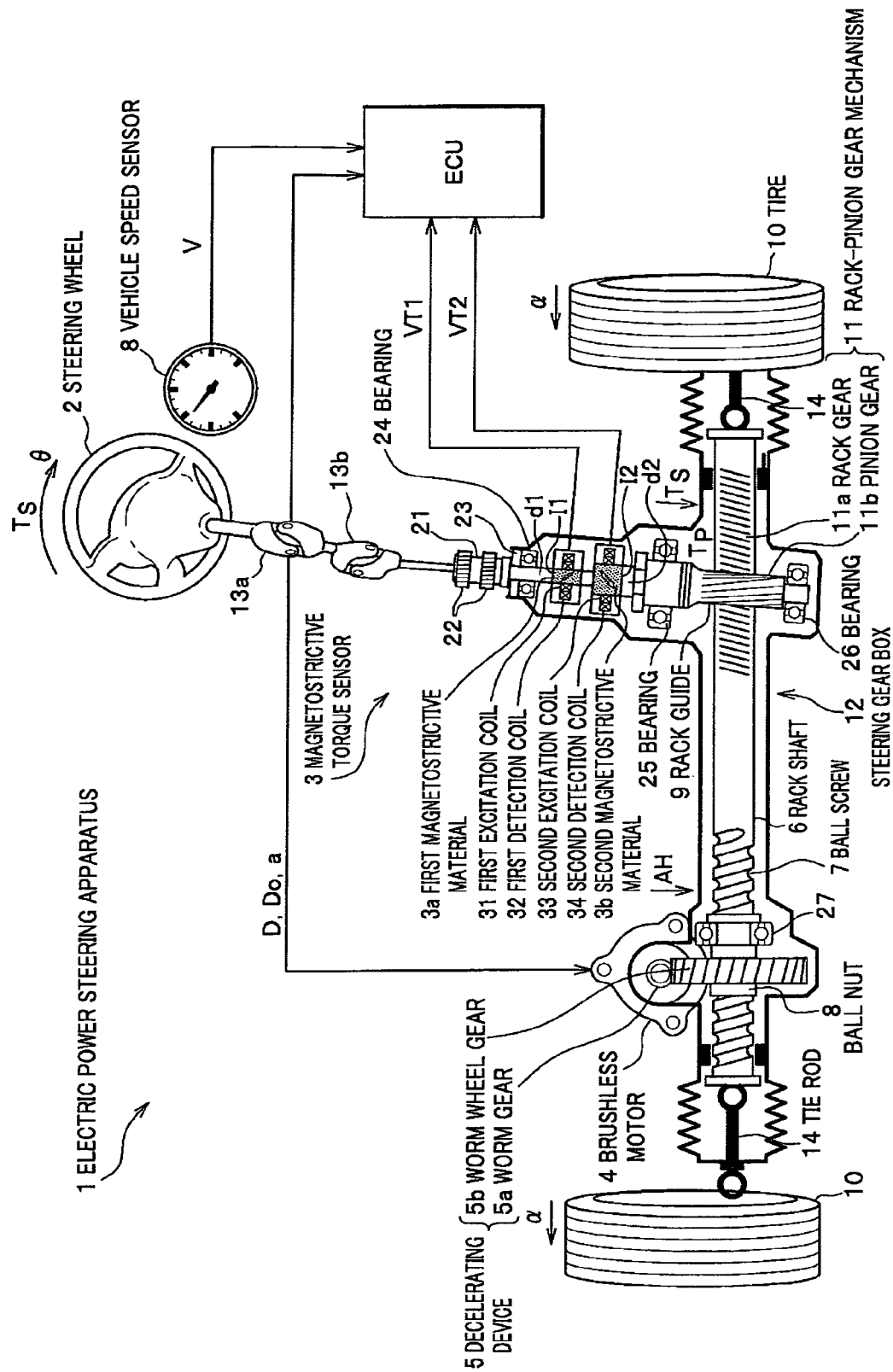

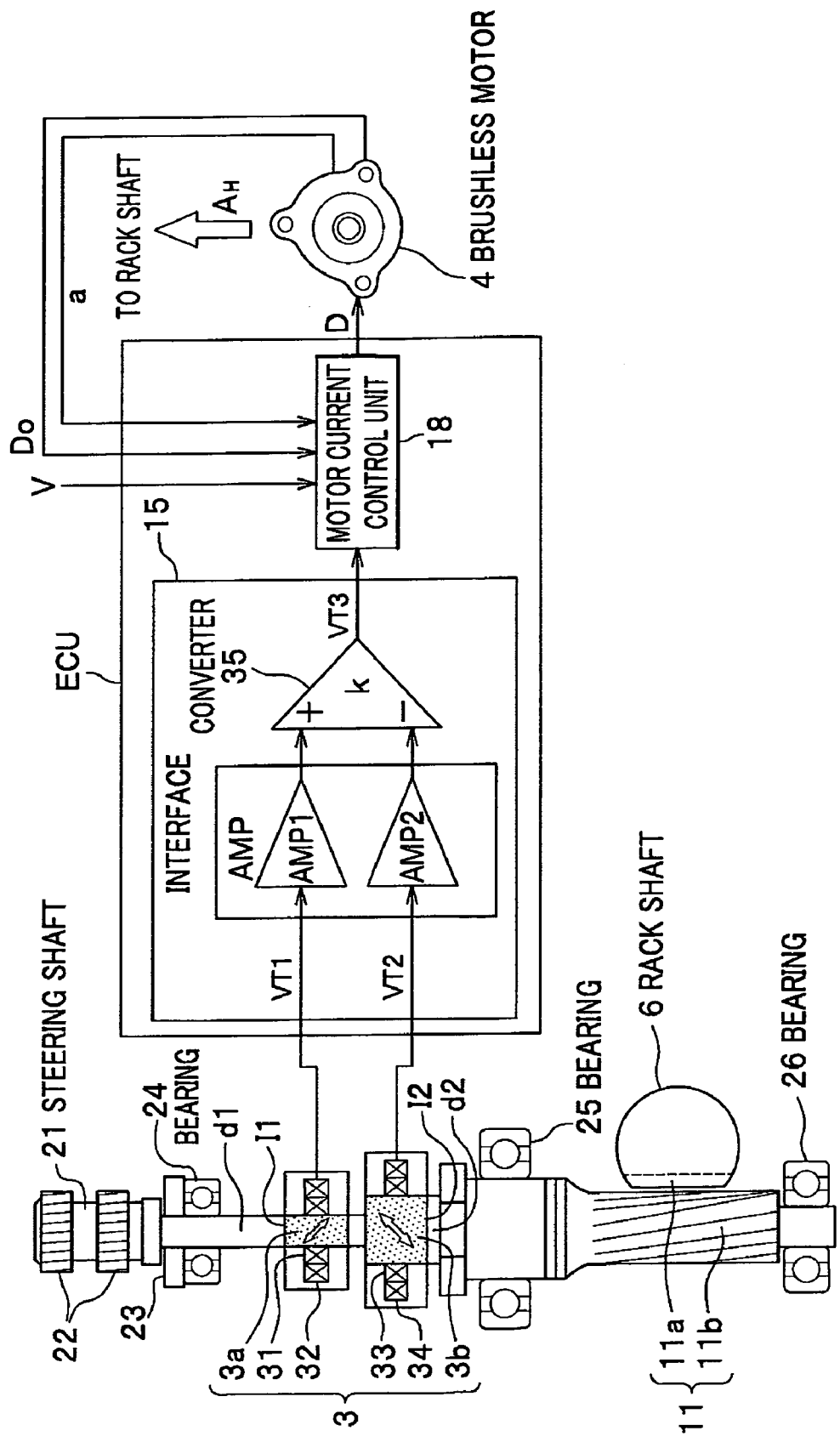

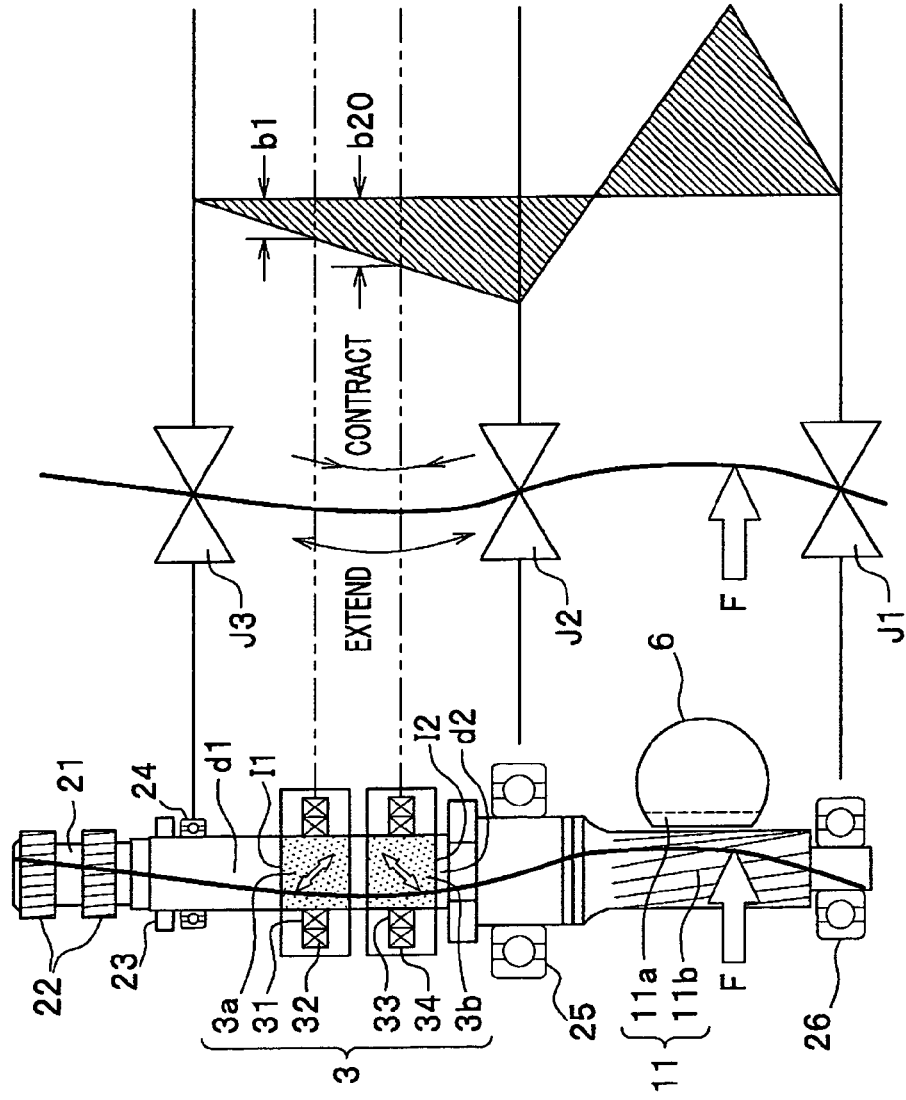

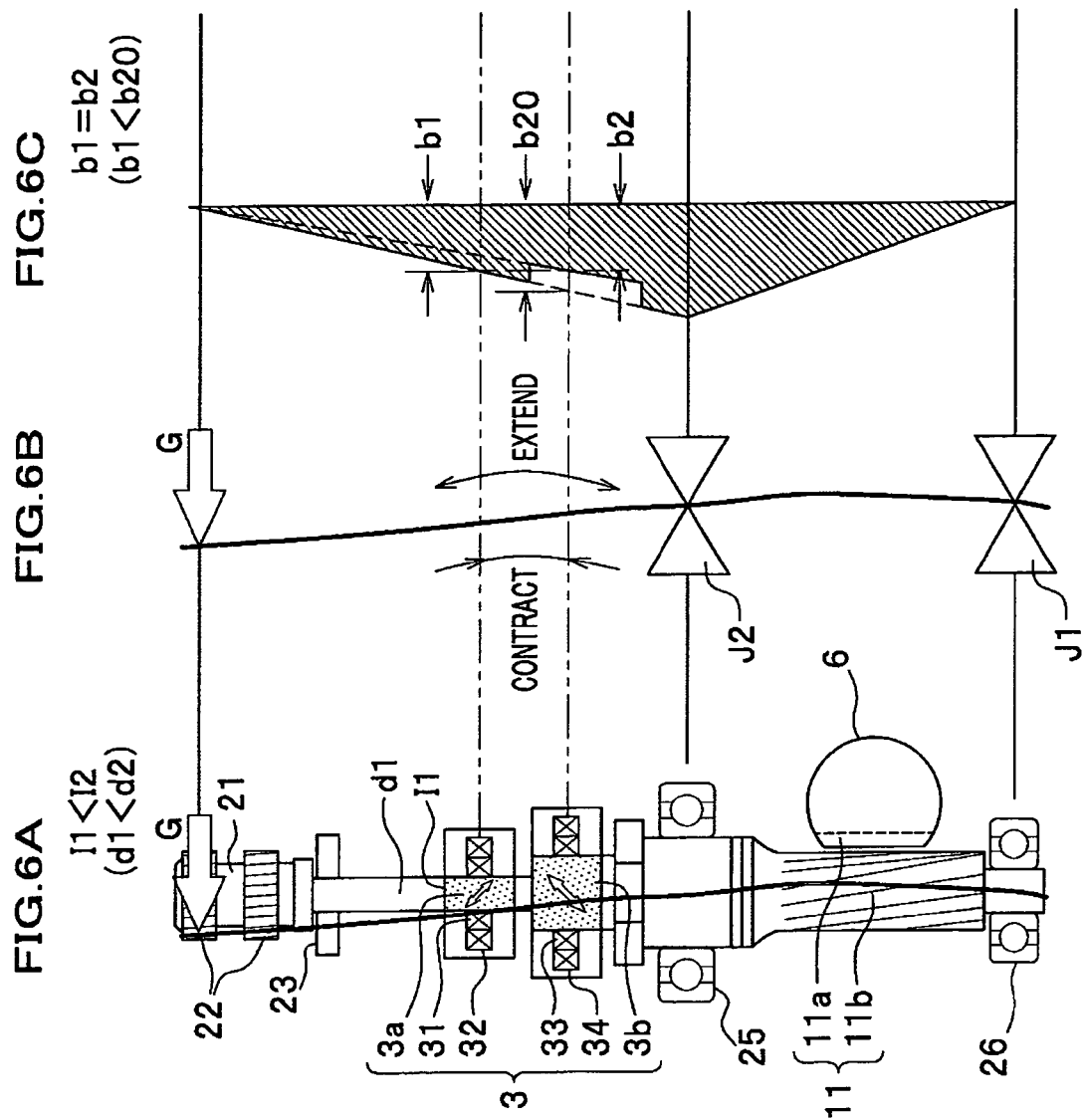

MAGNETOSTRICTIVE TORQUE SENSOR AND ELECTRIC POWER STEERING
APPARATUS

CROSS REFERENCE TO RELATED APPLICATIONS

This application claims the foreign priority benefit under Title 35, United States Code, §119(a)-(d) of Japanese Patent Application No. 2007-056596, filed on Mar. 7, 2007 in the Japan Patent Office, the disclosure of which is herein incorporated by reference in its entirety.

BACKGROUND OF THE INVENTION

1. Field of the Invention

The present invention relates to a magnetostrictive torque sensor which detects change in the magnetic permeability of a magnetostrictive material and outputs the change in the form of electrical change, thereby detecting torque applied to the rotating shaft, and an electric power steering apparatus including this magnetostrictive torque sensor mounted therein.

2. Description of the Related Art

Magnetostrictive torque sensors are mounted in electric power steering apparatuses for vehicles. The electric power steering apparatus is a support apparatus which, when a driver turns the steering wheel while driving the vehicle, has a motor cooperate therewith so as to assist the steering effort. In the electric power steering apparatus, the magnetostrictive torque sensor detects the steering torque caused in the steering shaft coupled to the steering wheel by the driver turning the steering wheel. The electric power steering apparatus controls the auxiliary steering force that is the output from the motor based on at least the detected steering torque and a vehicle speed signal from a vehicle speed sensor, which detects the speed of the vehicle, thereby reducing the steering effort of the driver.

A magnetostrictive torque sensor has been proposed where two magnetostrictive materials are provided one above the other on the surface of the rotating shaft that is the steering shaft so as to have opposite directions of magnetic anisotropy (refer to, e.g., JP2004-245636A). When the steering torque acts on the rotating shaft, rotation moment is produced and the rotating shaft is twisted, which distorts the magnetostrictive materials, and one of the magnetostrictive materials is further distorted while the distortion of the other is decreased because of an inverse magnetostriction characteristic due to magnetic anisotropy. Such increase and decrease in distortion change the alternating-current resistance and the like of detection coils provided around the magnetostrictive materials. The magnetostrictive torque sensor detects this change, thereby detecting the steering torque acting on the rotating shaft.

When the auxiliary steering force from the motor is transmitted to the rotating shaft via gears, bending moment to bend the center axis of the rotating shaft as well as rotation moment around the axis acts on the rotating shaft. This bending moment varies in magnitude according to the position of a section along the axis direction of the rotating shaft. To be specific, the bending moment is at zero at its point of action and increases as the section position goes away from the point of action. Hence, bending moments different in magnitude act respectively on the two magnetostrictive materials different in the position where they are formed. For the two magnetostrictive materials, the rotation moment and the bending moment are both detected as the distortion thereof, causing the measurement to deviate from a true value, and hence the accuracy of the magnetostrictive torque sensor for detecting rotation moment decreases. This is because bending moments different in magnitude act on the two magnetostrictive materials, and thus the bending moment components cannot be cancelled although a difference is obtained in output such as the alternating-current resistance from the respective detection coils.

Accordingly, JP2004-245636A further discloses a magnetostrictive torque sensor where one end of the rotating shaft is an open end so that no bending moment acts on the two magnetostrictive materials.

However, in such a magnetostrictive torque sensor, one end of the rotating shaft cannot be made completely open, but the one end is coupled to the steering wheel, so that when strongly turning the steering wheel as in performing stationary steering, e.g., while driving the vehicle into the garage, bending moment from the steering wheel may act on the rotating shaft. Further, it may be demanded that both ends of the rotating shaft be rotatably fixed without leaving one end open so that the rotating shaft is rotatably, stably fixed, depending on the environment in which the magnetostrictive torque sensor is installed.

SUMMARY OF THE INVENTION

A first aspect of the present invention provides a magnetostrictive torque sensor comprising: a rotating shaft rotatably supported; magnetostrictive materials provided on a surface of the rotating shaft at places different along the shaft from each other, magnetic permeability of which changes according to a magnitude of a rotary torque acting on the rotating shaft; and at least two detection coils disposed around the magnetostrictive materials, respectively, wherein second moments of area of the rotating shaft at the places are different from each other.

According to the first aspect, the second moments of area of the rotating shaft are made different from each other such that bending moments of the rotating shaft at the parts on which the detection means are respectively placed are equal to each other when a predetermined bending moment is being applied to the rotating shaft. Hence, by obtaining the difference in output between these detection means, the effects of the bending moments of the rotating shaft cancel out. Therefore, only the rotation moment of the rotating shaft can be detected stably, and highly accurately.

A second aspect of the present invention provides an electric power steering apparatus comprising: a magnetostrictive torque sensor comprising: a rotating shaft rotatably supported; magnetostrictive materials provided on a surface of the rotating shaft at places different along the shaft from each other, magnetic permeability of which changes according to a magnitude of a rotary torque acting on the rotating shaft; and at least two detection coils disposed around the magnetostrictive materials, respectively, wherein second moments of area of the rotating shaft at the places are different from each other; a rack-pinion gear mechanism for transmitting rotation of the steering shaft; and a bearing provided in between the detection coils and the rack-pinion gear mechanism to rotatably support the steering shaft, wherein the second moment of area of the rotating shaft at the place closer to the bearing is greater than the second moment of area at the place far from the bearing.

According to the second aspect of the present invention, the second moment of area of the rotating shaft at the part closer to the bearing is made greater than the second moment of area at the far part, such that bending moments of the rotating shaft at the parts on which the detection means are respectively placed are equal to each other when predetermined bending moment is being applied to the rotating shaft. Hence, by obtaining the difference in output between these detection means, the effects of the bending moments of the rotating shaft cancel out. Therefore, the rotation moment of the rotating shaft can be detected highly accurately.

BRIEF DESCRIPTION OF THE DRAWINGS

The object and features of the present invention will become more readily apparent from the following detailed description taken in conjunction with the accompanying drawings in which:

FIG. 1 is an illustration showing a configuration of an electric power steering apparatus having a magnetostrictive torque sensor according to a first embodiment of the present invention;

FIG. 2 is a diagram showing a configuration of the magnetostrictive torque sensor and its neighbors in the electric power steering apparatus according to the first embodiment;

FIG. 4A is an illustration of a prior art showing a point of application caused by that a force is generated by a rack gear in a case of a magnetostrictive torque sensor having the same cross section between parts where magnetostrictive materials are provided in which opposite ends are fixed;

FIG. 4B shows a schematic drawing in which only supporting points and the point of application are extracted from FIG. 4A;

FIG. 4C is a bending moment chart showing a magnitude of bending moment against a center axis of the rotating shaft in the magnetostrictive torque sensor shown in FIG. 4A;

FIG. 6 is diagrams for the magnetostrictive torque sensor (with one end being an open end and the other a fixed end) according to the second embodiment of the present invention, FIG. 6A shows the point where a force generated by a rack gear is applied to the magnetostrictive torque sensor, FIG. 6B shows only nodes and the force applying point, and FIG. 6C is a bending moment diagram showing the magnitude of bending moment against the center axis of the rotating shaft;

The same or corresponding elements or parts are designated with like references throughout the drawings.

DETAILED DESCRIPTION OF THE INVENTION

Figures 3A, 3B, 3C:
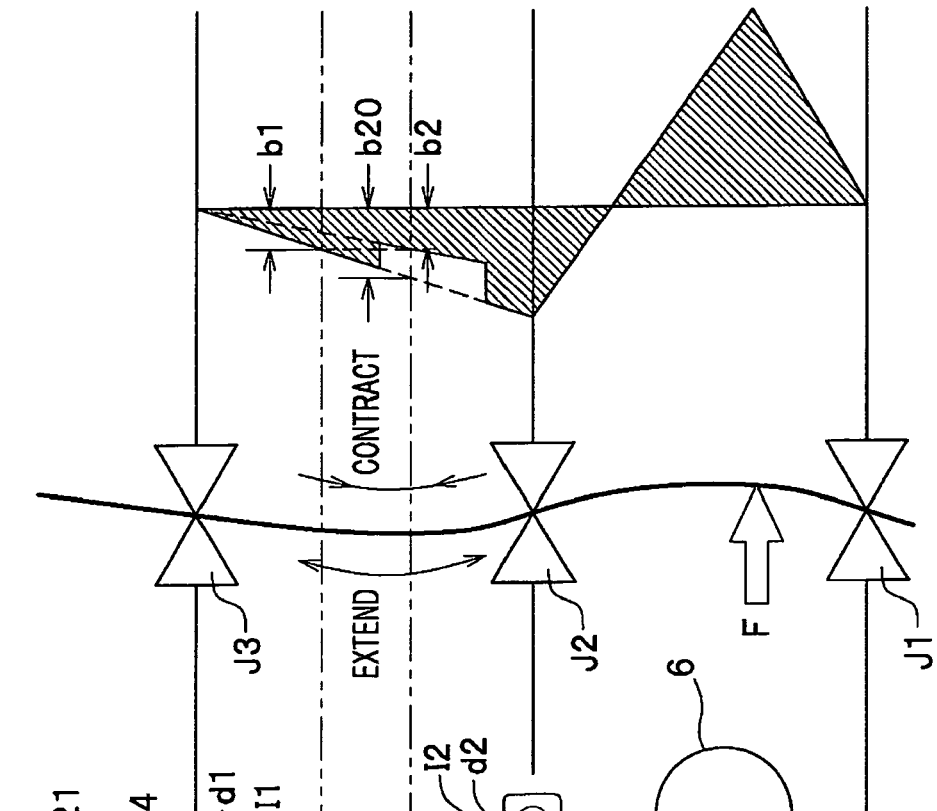
FIG. 3A is an illustration showing a point of application caused by that a force is generated by a rack gear in the magnetostrictive torque sensor (with its opposite ends being fixed ends) according to the first embodiment of the present invention.
FIG. 3B is a schematic drawing in which only supporting points and the point of application are extracted from FIG. 3A.
FIG. 3C is a bending moment diagram showing a magnitude of bending moment against a center axis of the rotating shaft in the magnetostrictive torque sensor shown in FIG. 3A.

With reference to the drawings will be described embodiments of the present invention. In the drawings, the same reference numerals indicate common parts with duplicate description thereof being omitted.

First Embodiment

FIG. 1 shows an entire configuration of an electric power steering apparatus (EPS) 1 according to a first embodiment of the present invention. A steering wheel 2 is coupled to the upper end of a steering shaft 21 via universal joints 13a, 13b. A pinion gear 11b is secured to the lower end of the steering shaft 21. The pinion gear 11b engages with a rack gear 11a, and the rack gear 11a and the pinion gear 11b form a rack-pinion gear mechanism 11. The rack-pinion gear mechanism 11 converts steering torque Ts of the steering shaft 21 into thrust of an axis direction of a rack shaft 6. The rack gear 11a is made by cutting into the rack shaft 6.

A ball screw 7 is also made by cutting into the rack shaft 6, and a ball nut 8 is provided on the inner side of a worm wheel gear 5b. The rack shaft 6 and the worm wheel gear 5b engage the ball nut 8 via a plurality of re-circulating balls (not shown). The outer teeth of the worm wheel gear 5b engage a worm gear 5a. The worm gear 5a is coupled to the rotation shaft of a brushless motor 4. The brushless motor 4 assists the driver to steer with power. The worm gear 5a and the worm wheel gear 5b form a decelerating device 5. The decelerating device 5 doubles auxiliary torque AH that the brushless motor 4 generates. The ball screw 7 converts the doubled auxiliary torque AH into thrust in the axis direction of the rack shaft 6. Respective inner ends of the tie rods 14 are fixed to opposite ends of the rack shaft 6, and a tire 10, as a front wheel, is attached to the other end of each respective tie rod 14.

The rack shaft 6 is supported at one end thereof by a bearing 27 via the ball screw 7 and at the other end by a rack guide (not shown) and is held in a steering gear box 12 so as to be able to freely move in the axis direction without rotating. The steering shaft 21 is rotatably supported in the steering gear box 12 by bearings 24, 25, 26.

The steering shaft 21 is provided with a tightener 22, for example, like a serration, on the steering shaft 21 to couple the universal joint 13b and the steering shaft 21. Further, on the steering shaft 21, a seal 23 is provided to seal the steering shaft 21 to the steering gearbox 12.

A magnetostrictive torque sensor 3 is provided on the steering shaft 21. The steering shaft 21 also functions as the rotating shaft of the magnetostrictive torque sensor 3. The magnetostrictive torque sensor 3 detects steering torque Ts applied by a driver through the steering wheel 2. The magnetostrictive torque sensor 3 has first and second magnetostrictive materials 3a, 3b formed on the surface of the rotating shaft (steering shaft) 21, of which the magnetic permeabilities change according to the magnitude and direction of rotary torque acting on the rotating shaft 21. The first and second magnetostrictive materials 3a, 3b are formed annularly around the rotating shaft 21. Fe—Ni-based or Fe—Cr-based magnetostrictive films are suitable as the first and second magnetostrictive materials 3a, 3b. The first and second magnetostrictive materials 3a, 3b are formed by plating, vapor deposition, or the like on the rotating shaft 21 or the like, for example, on the surface of the rotating shaft 21 or a hollow pipe into which the rotating shaft 21 is press fitted. The first and second magnetostrictive materials 3a, 3b may be integrated with the rotating shaft 21, or may be formed beforehand and bonded to the rotating shaft 21 by an adhesive.

Further, the magnetostrictive torque sensor 3 has a first excitation coil 31 and a first detection coil 32 around the first magnetostrictive material 3a. The first excitation coil 31 and first detection coil 32 are embodied as multi-turn coils provided individually but may be embodied by the same coil. Also, the magnetostrictive torque sensor 3 has a second excitation coil 33 and a second detection coil 34 around the second magnetostrictive material 3b. The second excitation coil 33 and second detection coil 34 may also be provided by the same coil. The first excitation coil 31 is placed on the rotating shaft 21 and excites the first magnetostrictive material 3a. The second excitation coil 33 is placed on the rotating shaft 21 and excites the second magnetostrictive material 3b. The first detection coil 32 is placed on the rotating shaft 21 and detects change in the magnetic permeability of the excited first magnetostrictive material 3a to output the detected change in the form of electrical change. The second detection coil 34 is placed on the rotating shaft 21 and detects change in the magnetic permeability of the excited second magnetostrictive material 3b to output the change in the form of electrical change.

Further, the rotating shaft 21 is formed as follows:
second moment of area I1 of the rotating shaft 21, at a part thereof on which the first detection coil 32 is placed, differs from second moment of area I2 of the rotating shaft 21 at a part thereof on which the second detection coil 34 is placed, and here the second moment of area I1 is smaller than the second moment of area I2 (I1<I2). In other words, of the parts of the rotating shaft 21 on which the first detection coil 32 and the second detection coil 34 are respectively placed, the second moment of area I2 of the rotating shaft 21 at the part closer to the bearing 25 is greater than the second moment of area I1 at the far part (I1<I2). More specifically, the diameter d1 of the rotating shaft 21 at the part on which the first detection coil 32 is placed differs from the diameter d2 of the rotating shaft 21 at the part on which the second detection coil 34 is placed, and here the diameter d1 is smaller than the diameter d2 (d1<d2). However, the inner diameter of the first excitation coil 31 and first detection coil 32 and the inner diameter of the second excitation coil 33 and second detection coil 34 may be the same. This is for the following reason. The diameter d1 is smaller than the diameter d2 (d1<d2), and hence the angle of torsion due to applied torque becomes greater on the diameter d1 side than on the diameter d2 side, thus producing high sensitivity. Although with the inner diameters being the same, the air gap is larger on the diameter d1 side than on the diameter d2 side, enough sensitivity equivalent to that on the diameter d2 side is also obtained on the diameter d1 side.

The steering torque Ts is generated by the driver turning the steering wheel 2 and transmitted to the rotating shaft 21. The transmitted steering torque Ts is detected by the magnetostrictive torque sensor 3, and a detected signal VT1 is output from the first detection coil 32. Likewise, a detected signal VT2 is output at the second detection coil 34. The outputs VT1, VT2 are applied to a controller ECU. The controller ECU comprises a computer and receives a vehicle speed signal V from a vehicle speed sensor 8 detecting the speed of the vehicle. Also, the controller ECU, supplying a motor current D to the brushless motor 4, receives a measured current signal Do obtained by measuring the motor current D, a motor rotation angle signal a obtained by measuring the rotation angle of the rotor of the brushless motor 4, and the like.

The controller ECU outputs a motor current D to the brushless motor 4 based on the received outputs VT1, VT2, vehicle speed signal V, measured current signal Do, motor rotation angle signal a, and the like.

The brushless motor 4 outputs the auxiliary torque AH to assist the steering torque Ts according to the motor current D, and the auxiliary torque AH is transmitted to the rack shaft 6 via the decelerating device 5 and the ball screw 7, by which it is converted to linear motion. Also, the steering torque Ts generated directly by the driver is transmitted to the rack shaft 6 via the rack-pinion gear mechanism 11 with the steering torque Ts being converted to linear motion.

The linear motion from the steering torque Ts transmitted to the rack shaft 6 and the linear motion from the auxiliary torque AH are combined to move the tie rods 14, thereby changing the travel direction of the tires 10. By combining the auxiliary torque AH with the steering torque Ts, the steering torque Ts necessary for the driver to steer can be reduced. The turning angle $\theta$ of the steering wheel 2 rotates the travel direction of the tires 10 through $\alpha$.

For example, for easiness to understand, let Ts be the value of the steering torque Ts, AH be the value of the auxiliary torque AH, and a constant kA be a coefficient of the auxiliary torque AH, then AH=kA×Ts. Let Tp be pinion torque, which is a load, then the pinion torque Tp is the sum of steering torque Ts and auxiliary torque AH (Tp=Ts+AH), and hence Ts=Tp/(1+kA). Therefore, the steering torque Ts is 1/(1+kA) times the pinion torque Tp, where kA≧0, and smaller than the pinion torque Tp, thus reducing the steering torque Ts. Although in the above the kA is a constant for easiness to understand, the kA preferably decreases as the vehicle speed increases. By this means, even though a load to rotate the tires 10 through $\alpha$ relative to the road surface decreases as the vehicle's traveling speed becomes higher, the steering torque Ts required to rotate the tires 10 through $\alpha$ can be large enough to give a feeling of reaction to the driver.

FIG. 2 is a diagram showing the configuration of the magnetostrictive torque sensor 3 and neighbors thereof in the electric power steering apparatus 1. As shown in FIG. 2, the controller ECU has an interface 15. The interface 15 has a converter 35 and an amplifier AMP. The amplifier AMP has an amplifier AMP1 for amplifying the output VT1 and an amplifier AMP2 for amplifying the output VT2. The converter 35 calculates the difference between the output VT1 output from the amplifier AMP1 and the output VT2 output from the amplifier AMP2 to output a detected torque signal VT3. Further, the controller ECU has a motor current control unit 18 for outputting the motor current D to make the brushless motor 4 operate based on the detected torque signal VT3, vehicle speed signal V, measured current signal Do, and motor rotation angle signal a. Yet further, the controller ECU calculates the sum of the outputs VT1, VT2 and determines whether the sum is within a predetermined range, thereby performing a failure diagnosis and the like.

Next, will be described bending moment acting on the magnetostrictive torque sensor 3 in detail.

As shown in FIG. 3A, the rotating shaft 21 of the magnetostrictive torque sensor 3 is rotatably supported by the bearings 24, 25, 26. The bearing 24 is provided on the upper end of the rotating shaft 21. The bearings 24, 25 are so arranged that the first magnetostrictive material 3a, the first excitation coil 31, the first detection coil 32, the second magnetostrictive material 3b, the second excitation coil 33, and the second detection coil 34 are sandwiched. The bearing 25 is provided between the rack-pinion gear mechanism 11 and the second detection coil 34. The bearing 26 is provided on the lower end of the rotating shaft 21 below the rack-pinion gear mechanism 11.

When the auxiliary torque AH is output at the brushless motor 4 of FIG. 1, the auxiliary torque AH is transmitted to the rack shaft 6. Under the influence of the pressure angle (e.g. about 20°) between the pinion gear 11b and the rack gear 11a which engage each other, helical angles exist in the direction of going away from the rack shaft 6 and in the longitudinal direction of the rack shaft 6. Hence, the auxiliary torque AH is translated into a resultant force in a perpendicular direction to the teeth of the pinion gear 11b and the rack gear 11a, and thus a force F acts on the rotating shaft 21 at the pinion gear 11b as illustratively shown in, e.g., FIG. 3A. This force F produces rotation moment to rotate the rotating shaft 21 around the rotation axis of the bearings 24, 25, 26. At the same time, this force F also produces bending moment to bend the rotating shaft 21 as indicated by the thick line in FIG. 3A, which shows exaggerated displacement of the center axis of the rotating shaft 21. As shown in FIG. 3B, the displacement of the center axis of the rotating shaft 21 has the bearings 26, 25, 24 as nodes J1, J2, J3 respectively. Because the force F is applied to a point in between them, the part of the rotating shaft 21 between the nodes J1 and J2 is deformed by the bending moment such that the side of the rotating shaft 21 on which the force F is acting contracts, while the opposite side extends. Meanwhile, with no force applying point in between the nodes J2 and J3, the part of the rotating shaft 21 between the nodes J2 and J3 is deformed by the bending moment such that the side of the rotating shaft 21 on which the force F is acting extends while the opposite side contracts. Such deformation of the rotating shaft 21 by the bending moment distorts the first and second magnetostrictive materials 3a, 3b.

FIG. 3C is a bending moment diagram (BMD) showing the magnitude of the bending moment against the center axis of the rotating shaft 21. In this bending moment diagram, the premise is that the second moment of area I2 of the rotating shaft 21 at its part surrounded by the second magnetostrictive material 3b is greater than the second moment of area I1 of the rotating shaft 21 at its part surrounded by the first magnetostrictive material 3a (I1<I2), and it is assumed that the second moment of area for all parts of the rotating shaft 21 except the part surrounded by the second magnetostrictive material 3b is equal to the second moment of area I1 of the rotating shaft 21 at the part surrounded by the first magnetostrictive material 3a. For example, by setting the diameter d2 of the rotating shaft 21 at its part surrounded by the second magnetostrictive material 3b to be greater than the diameter d1 of the rotating shaft 21 at the part surrounded by the first magnetostrictive material 3a (d1<d2), the second moment of area I2 of the rotating shaft 21 at its part surrounded by the second magnetostrictive material 3b becomes greater than the second moment of area I1 of the rotating shaft 21 at its part surrounded by the first magnetostrictive material 3a (I1<I2).

It will be understood from the foregoing that at any given point on the rotating shaft 21, the second moment of area is directly proportional to the diameter of the shaft.

As such, the second moments of area I1, I2 of the rotating shaft 21 are different, and hence when predetermined bending moment is applied to the rotating shaft 21, bending moments b1, b2 of the rotating shaft 21 at the parts on which the first and second detection coils 32, 34 are respectively placed can be made equal (b1=b2) as shown in FIG. 3C.

FIG. 4A to 4C show a prior art in which the diameters d1, d2 of the rotating shaft 21 are equal (d1=d2). In FIGS. 4A, 4B, the diameters d1, d2 of the rotating shaft 21 are equal (d1=d2) and the second moments of area I1, I2 are equal (I1=I2), when predetermined bending moment is applied to the rotating shaft 21, bending moments b1, b20 of the rotating shaft 21 at the parts on which the detection coils 32, 34 are respectively placed are not equal, but the bending moment b1 is smaller than the bending moment b20 (b1<b20) as shown in FIG. 4C. This adversely affects the detection of the magnetostrictive torque sensor, thus decreasing accuracy.

Figure 5:
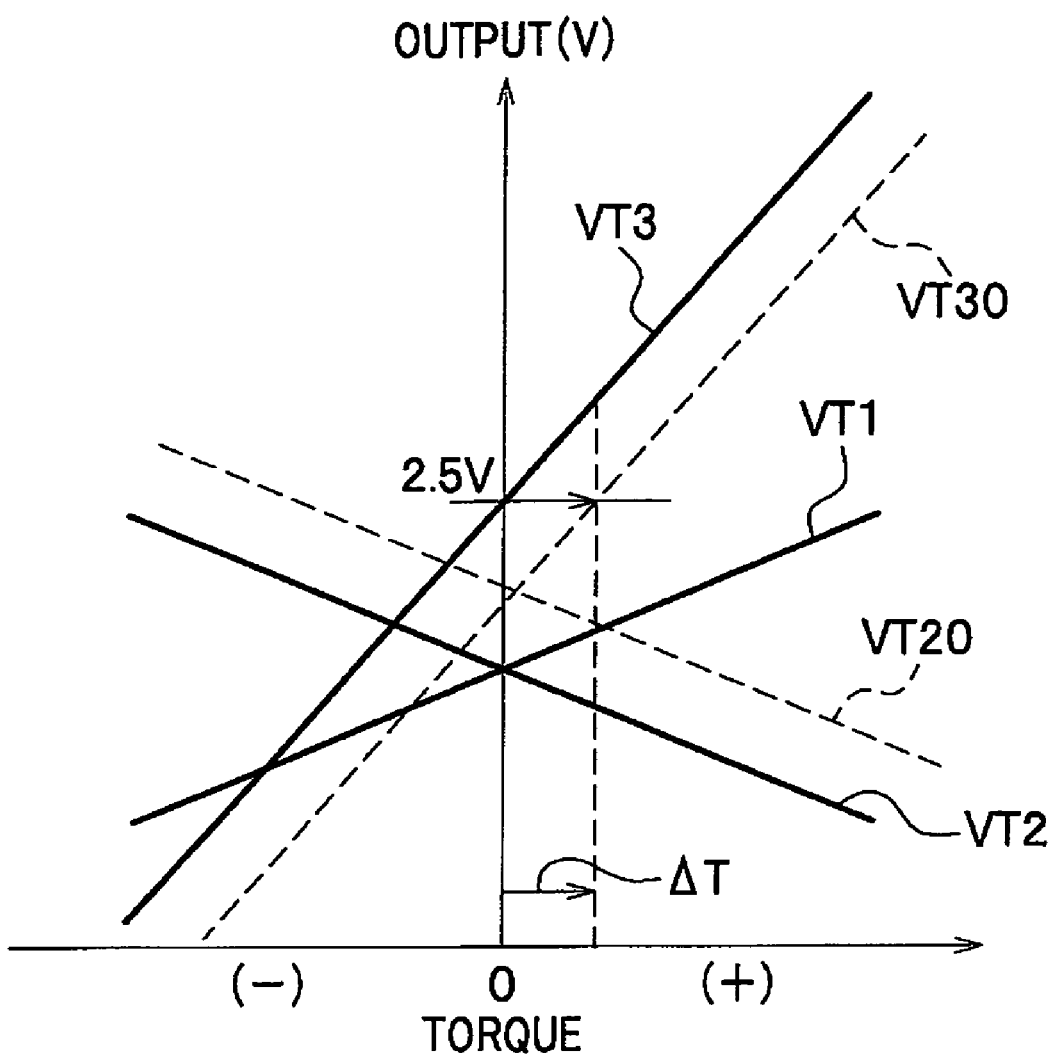
FIG. 5 shows the output characteristics of VT1 output from first detection means, of VT2 output from second detection means, and of a detected torque signal VT3 of the first embodiment, and the output characteristics of VT20 output from second detection means and of a detected torque signal VT30 of the conventional art.

FIG. 5 is a chart showing the output characteristics of the outputs VT1, VT2 and the detected torque signal VT3. The outputs VT1, VT2 are obtained as follows. While alternating currents are flowing through the first and second excitation coil 31, 33 (see FIG. 2), when the torque is applied, variations in permeability that is the magnetostrictive characteristic of the first and second magnetostrictive materials 3a, 3b are detected by the first and second detection coils 32, 34, which output the outputs VT1, VT2 in the form of voltage variations.

The outputs VT1, VT2 produced by the first and second magnetostrictive materials 3a, 3b before magnetic anisotropy is given show output characteristics almost symmetrical with respect to the acting directions of the torque (clockwise turn (+), counterclockwise turn (−)). Then, clockwise turn torque sufficiently larger than that in a use range is made to remain in the first magnetostrictive material 3a, thereby giving magnetic anisotropy thereto to obtain the output characteristic of the output VT1. Likewise, counterclockwise turn torque sufficiently larger than that in the use range is made to remain in the second magnetostrictive material 3b, thereby giving magnetic anisotropy thereto to obtain the output characteristic of the output VT2.

Then, the converter 35 (see FIG. 2) subtracts VT2 from VT1 and multiplies the subtracted value by a coefficient k to obtain VT3 (=k×(VT1−VT2)). Then, the VT3 is shifted so as to be at 2.5 V when the torque is at zero. By using this detected torque signal VT3, the acting direction and magnitude of the torque can be detected, and also sensitivity (the gradient of graph VT3 of FIG. 5) can be improved (over the gradient of graph VT1).

In the first embodiment, as shown in FIG. 3C, because the bending moments b1, b2 are equal in magnitude (b1=b2), the distortion amounts of the first and second magnetostrictive materials 3a, 3b due to the bending moments b1, b2 are equal, and hence the outputs VT1, VT2 are equal when the torque is at zero as shown in FIG. 5, and their output characteristics are symmetrical with respect to the output axis passing through the point where torque=0. Hence, by subtracting the output VT2 from the output VT1, the effects of the bending moments b1, b2 of the rotating shaft 21 cancel out, so that the actual rotation moment of the rotating shaft 21 can be detected. Since the rotation moment of the rotating shaft 21 can be detected highly accurately, steering feeling can be improved.

On the other hand, in the case as shown in FIG. 4C, because the bending moment b20 is greater than the bending moment b1 (b1<b20), the distortion amount of the second magnetostrictive material 3b is also greater than that of the first magnetostrictive material 3a, and hence the output characteristic of the second detection coil 34 becomes an output characteristic as indicated by VT20 in FIG. 5, obtained by shifting the output VT2 in the direction of the output becoming greater. Thus, a detected torque signal VT30 in the case of FIG. 4C is lower than 2.5 V when the torque is at zero. When torque of ΔT is applied, the detected torque signal VT30 in the case of FIG. 4C becomes 2.5 V, and the auxiliary torque AH becomes zero. Hence, the driver cannot get expected auxiliary torque AH but will feel an uneasy steering feeling. To put it plainly, the detected torque signal VT3 proportional to (b1-b20) is output as the result of detecting the steering torque.

To be more specific, although the bending moments vary in accordance with the magnitude of axial force from the rack shaft 6 that is the load from the tires 10 (see FIG. 1), it is expected that b1=b20 (≈0), when the magnitude of axial force from the rack shaft 6 is small. As the axial force increases, bending moment increases, resulting in b20>b1, and thus a false signal indicating that the steering torque is detected as being large is output. Hence, the current supply to the brushless motor 4 increases, thus decreasing the steering torque Ts on the steering wheel 2, so that the steering wheel 2 becomes lighter. Conversely, if the steering torque is detected as being small, the current supply to the brushless motor 4 decreases, thus increasing the steering torque Ts on the steering wheel 2, so that the steering wheel 2 becomes heavier. As such, while actual steering torque Ts remains the same, the steering torque Ts changes, thus causing the rolling or vibration of the steering torque. Hence, the steering feeling is lowered.

Therefore, since the second moment of area I1 is given by the equation $I1=\pi \times d1^4/64$ and the second moment of area I2 is given by the equation $I2=\pi \times d2^4/64$, by setting the ratio of the diameter d1 to the diameter d2 (d1/d2) so as to substantially satisfy the equation $b1/b20=(d1/d2)^4$, the bending moments b1, b2 become substantially equal in magnitude (b1≈b2). It is supposed that if the diameters d1, d2 are different in value, the distortion amount due to the rotation moment is also different between the two, but because the rotation moment is proportional to the diameter squared while the bending moment is proportional to the diameter to the fourth power, the difference of the diameters need not be made so large. Hence, the difference in the distortion amount due to the rotation moment is not much affected by the difference in diameter. But, it is better to take into account the influence when determining the ratio of the diameter d1 to the diameter d2 (d1/d2).

Second Embodiment

FIG. 6A is a diagram of the configuration of a magnetostrictive torque sensor according to a second embodiment of the present invention. The magnetostrictive torque sensor of the second embodiment differs from the magnetostrictive torque sensor of the first embodiment in that not both ends of the rotating shaft 21 are rotatably supported, but the upper end of the rotating shaft 21 is an open end, specifically, in that the bearing 24 of FIG. 3 is omitted. However, the upper end of the rotating shaft 21 is not actually a completely open end, but the steering wheel 2 is coupled to the upper end, and a force G from the steering wheel 2 acts on the upper end of the rotating shaft 21 via the universal joints 13a, 13b when strongly turning the steering wheel as in performing stationary steering, e.g., while driving the vehicle into the garage.

The rotating shaft 21 of the magnetostrictive torque sensor 3 is rotatably supported by the bearings 25, 26. The first magnetostrictive material 3a, the first excitation coil 31, the first detection coil 32, the second magnetostrictive material 3b, the second excitation coil 33, and the second detection coil 34 are not sandwiched by the bearings 25, 26. The bearing 25 is provided in between the rack-pinion gear mechanism 11, and the first detection coil 32 and the second detection coil 34. The bearing 26 is provided on the lower end of the rotating shaft 21 below the rack-pinion gear mechanism 11.

The force G generates rotation moment to rotate the rotating shaft 21 around the rotation axis of the bearings 25, 26. At the same time, this force G also generates bending moment to bend the rotating shaft 21 as indicated by the thick line in FIG. 6A, which shows exaggerated displacement of the center axis of the rotating shaft 21. As shown in FIG. 6B, the displacement of the center axis of the rotating shaft 21 occurs in which the bearings 26, 25 are as nodes J1, J2 respectively. Hence, with the force G being applied to a point above the node J2, the part of the rotating shaft 21 above the node J2 is deformed by the bending moment such that the side of the rotating shaft 21 where the force G is acting extends while the opposite side contracts. With no force applying point in between them, the part of the rotating shaft 21 between the nodes J1 and J2 is deformed by the bending moment such that the side of the rotating shaft 21 where the force G is acting extends while the opposite side contracts. Such deformation of the rotating shaft 21 by the bending moment distorts the first and second magnetostrictive materials 3a, 3b.

FIG. 6C is a bending moment diagram (BMD) showing the magnitude of the bending moment against the center axis of the rotating shaft 21 according to the third embodiment. Also in the second embodiment, as in the first embodiment, the second moment of area I2 of the rotating shaft 21 at its part surrounded by the second magnetostrictive material 3b is greater than the second moment of area I1 of the rotating shaft 21 at its part surrounded by the first magnetostrictive material 3a (I1<I2), and hence when predetermined bending moment is applied to the rotating shaft 21, bending moments b1, b2 of the rotating shaft 21 at the parts on which the first and second detection coils 32, 34 are respectively placed become equal (b1=b2).

Figures 7A, 7B, 7C:
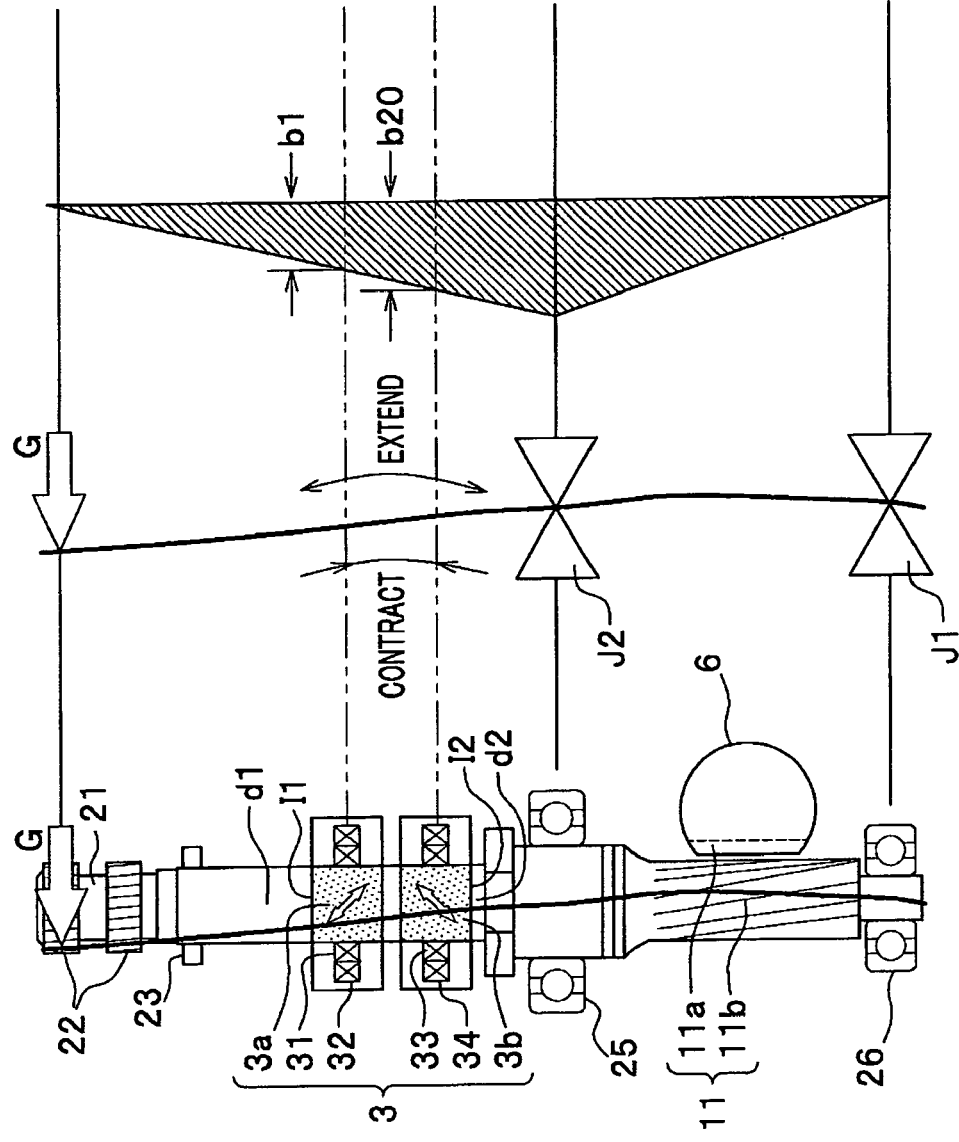
FIG. 7A is an illustration of a prior art showing the point where a force generated by a rack gear is applied to the magnetostrictive torque sensor.
FIG. 7B shows only nodes and the force applying point in the case of FIG. 7A.
FIG. 7C is a bending moment diagram showing the magnitude of bending moment against the center axis of the rotating shaft in the case of FIG. 7A.

On the other hand, as shown in FIGS. 7A, 7B, if the diameters d1, d2 of the rotating shaft 21 are equal (d1=d2) and the second moments of area I1, I2 are equal (I1=I2), when predetermined bending moment is applied to the rotating shaft 21, bending moments b1, b20 of the rotating shaft 21 at the parts on which the detection coils 32, 34 are respectively placed is not equal, but the bending moment b1 is smaller than the bending moment b20 (b1<b20) as shown in FIG. 7C. To be specific, it is expected that b1=b20 when the magnitude of axial force from the rack shaft 6 that is the load from the tires 10 (see FIG. 1) is small. As the axial force increases, bending moment increases, resulting in b20>b1, and thus a false signal indicating that the steering torque is detected as being large is output. Hence, the current supply to the brushless motor 4 increases, thus decreasing the steering torque Ts on the steering wheel 2, so that the steering wheel 2 becomes lighter. As such, while actual steering torque Ts remains the same, the steering torque Ts changes, thus causing the rolling or vibration of the steering torque. Hence, the steering feeling is lowered.

On the other hand, in the second embodiment, as in the first embodiment, because the bending moments b1, b2 are equal in magnitude (b1=b2), the distortion amounts of the first and second magnetostrictive materials 3a, 3b due to the bending moments b1, b2 are equal, and thus the distortion amounts due to the bending moments b1, b2 of the rotating shaft 21 can easily cancel out. Hence, the actual rotation moment of the rotating shaft 21 can be detected. Since the rotation moment of the rotating shaft 21 can be detected highly accurately, steering feeling can be improved.

Third Embodiment

Figure 8:
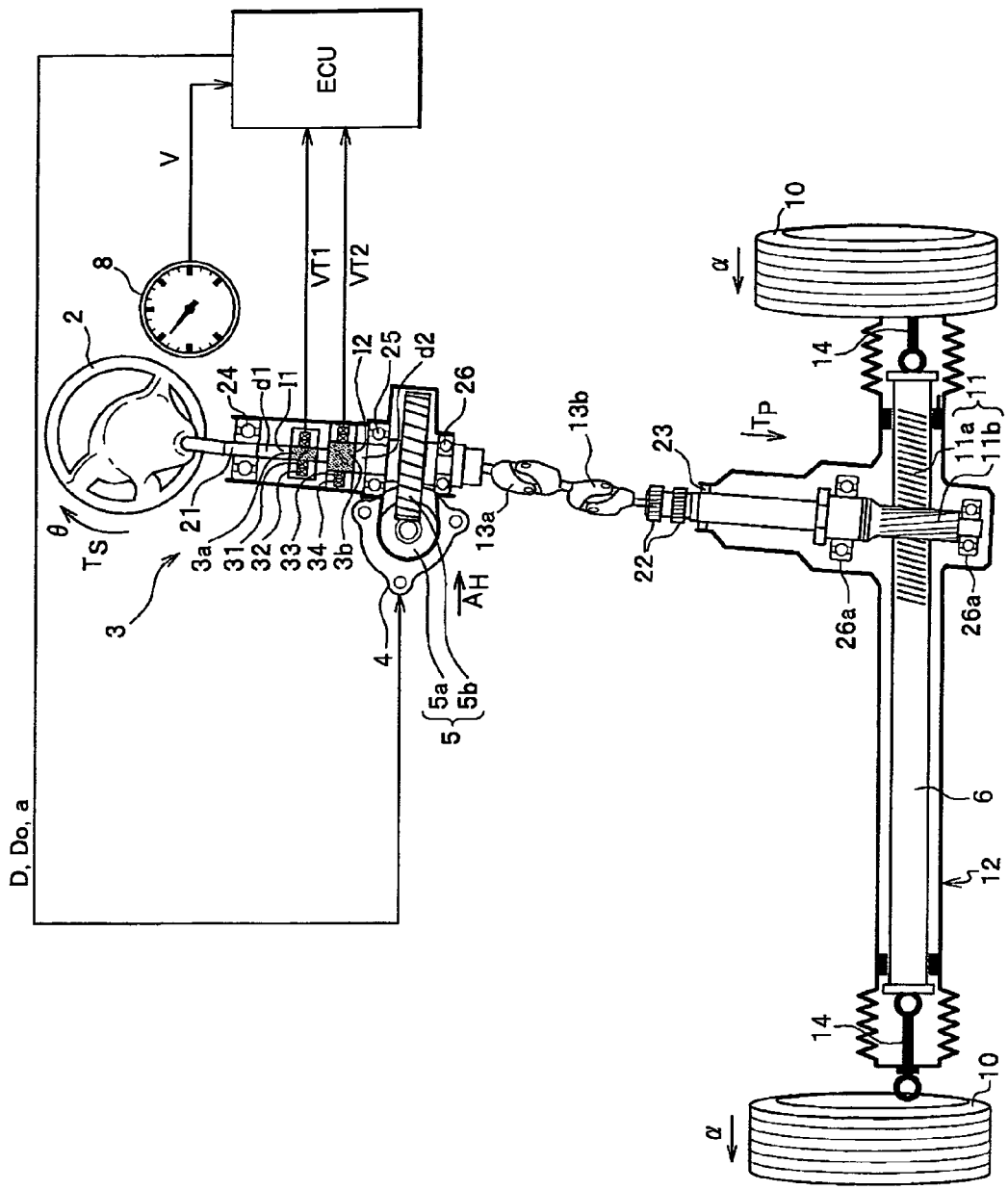
FIG. 8 is a diagram showing the configuration of an electric power steering apparatus having a magnetostrictive torque sensor according to a third embodiment of the present invention.

FIG. 8 is a diagram of the configuration of an electric power steering apparatus having a magnetostrictive torque sensor according to a third embodiment of the present invention. The electric power steering apparatus of the third embodiment differs from the electric power steering apparatus of the first embodiment in that instead of the rack-pinion gear mechanism 11, the decelerating device 5 is provided in between the bearings 25, 26. Consequently, the rack-pinion gear mechanism 11 is provided below the bearing 26 as similar to the first embodiment, but the mechanism 11 is located also below the bearing 25. The pinion gear 11b is rotatably supported by a new bearing 26a. Further, the universal joints 13a, 13b and the tightener 22 have been moved from above the bearing 24 to below the bearing 26. According to the third embodiment, the auxiliary torque AH can be applied not to the rack shaft 6 but directly to the rotating shaft 21. By this means, the force F as shown in FIG. 3A of the first embodiment is applied to the steering shaft 21 via the worm wheel gear 5b, thus producing bending moment, which causes concern.

When the auxiliary torque AH is output from the brushless motor 4, the auxiliary torque AH is transmitted to the worm gear 5a, and the auxiliary torque AH is converted into a resultant force in a perpendicular direction to the teeth of the worm gear 5a and the worm wheel gear 5b, and thus, a force F acts on the rotating shaft 21 at the worm wheel gear 5b as in the first embodiment. This force F produces rotation moment and at the same time produces bending moment to displace the center axis of the rotating shaft 21 with the bearings 26, 25, 24 as nodes J1, J2, J3 respectively as shown in FIG. 3B. Such deformation of the rotating shaft 21 by the bending moment distorts the first and second magnetostrictive materials 3a, 3b. Also in the third embodiment, as in the first embodiment, the second moment of area I2 of the rotating shaft 21 at its part surrounded by the second magnetostrictive material 3b is greater than the second moment of area I1 of the rotating shaft 21 at its part surrounded by the first magnetostrictive material 3a (I1<I2), and hence when predetermined bending moment is applied to the rotating shaft 21, bending moments b1, b2 of the rotating shaft 21 at the parts on which the detection coils 32, 34 are respectively placed become equal (b1≈b2). Hence, the distortion amounts of the first and second magnetostrictive materials 3a, 3b due to the bending moments b1, b2 are equal, and thus the distortion amounts due to the bending moments b1, b2 of the rotating shaft 21 can easily cancel out. Hence, the actual rotation moment of the rotating shaft 21 can be detected. Since only the rotation moment of the rotating shaft 21 can be detected stably, more highly accurately, steering feeling can be improved.

The invention claimed is:

1. An electric power steering apparatus comprising:
 a magnetostrictive torque sensor comprising:
 a rotating shaft rotatably supported;
 magnetostrictive materials provided on a surface of the rotating shaft at places different along the shaft from each other, magnetic permeability of which changes according to a magnitude of a rotary torque acting on the rotating shaft; and
 at least two detection coils disposed around the magnetostrictive materials, respectively,
 wherein second moments of area of the rotating shaft at the places are different from each other; and
 a steering mechanism that transmits the rotary torque to a tire,
 wherein the second moment of area of the rotating shaft at the place closer to the tire via the steering mechanism is greater than the second moment of area at the place far from the tire via the steering mechanism.

2. The magnetostrictive torque sensor according to claim 1, wherein the second moments of area at the places are different from each other so as to equalize bending moments of the rotating shaft at the places to each other when a predetermined bending moment is being applied to the rotating shaft.

3. The electric power steering apparatus as claimed in claim 1, wherein the second moments of area at the places are different from each other so as to equalize bending moments of the rotating shaft at the parts on which the detection coils are respectively placed are equal to each other when a predetermined bending moment is being applied to the rotating shaft.

4. The electric power steering apparatus as claimed in claim 1, wherein the steering mechanism comprises:
 a rack-pinion gear mechanism for transmitting rotation of the steering shaft; and
 a bearing provided in between the detection coils and the rack-pinion gear mechanism to rotatably support the steering shaft.

* * * * *